United States Patent
Gennesseaux

(10) Patent No.: US 6,371,462 B2
(45) Date of Patent: Apr. 16, 2002

(54) ACTIVE HYDRAULIC ANTI-VIBRATION SUPPORT AND ACTIVE ANTIVIBRATION SYSTEM INCORPORATING SAID SUPPORT

(75) Inventor: André Gennesseaux, Conie-Molitard (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/740,599

(22) Filed: Dec. 19, 2000

(30) Foreign Application Priority Data

Dec. 22, 1999 (FR) .............................................. 99 16243

(51) Int. Cl.$^7$ ................................................ F16F 13/00
(52) U.S. Cl. ............................ 267/140.13; 267/140.14; 267/122
(58) Field of Search ........................ 267/140.14, 140.13, 267/140.15, 122, 219, 35; 248/562, 636

(56) References Cited

U.S. PATENT DOCUMENTS

| | | | |
|---|---|---|---|
| 5,167,403 A | | 12/1992 | Muramatsu et al. ... 267/140.13 |
| 5,170,998 A | * | 12/1992 | Muramatsu ............ 267/140.13 |
| 5,215,293 A | * | 6/1993 | Muramatsu et al. ... 267/140.14 |
| 5,217,211 A | * | 6/1993 | Ide et al. ............... 267/140.13 |
| 5,314,173 A | * | 5/1994 | Ide et al. ............... 267/140.14 |

FOREIGN PATENT DOCUMENTS

| | | |
|---|---|---|
| DE | 3 801 108 | 7/1989 |
| DE | 196 20 219 | 11/1996 |
| GB | 2 301 165 | 11/1996 |

OTHER PUBLICATIONS

French Preliminary Search Report dated Sep. 18, 2000, French Appl. No. FR 9916243.

* cited by examiner

*Primary Examiner*—Robert J. Oberleitner
*Assistant Examiner*—Mariano Sy
(74) *Attorney, Agent, or Firm*—Marshall, Gerstein & Borun

(57) ABSTRACT

Active hydraulic anti-vibration support comprising two armatures joined by an elastomer body partially bounding a working chamber filled with liquid and communicating with a compensating chamber, an exciter member in contact with the working chamber, a control device designed to displace the exciter member and an elastic return device applying a force to the exciter member to return it to its non-operating position in accordance with a certain elasticity curve which has a tangent for a first displacement value corresponding to the non-operating position of the exciter member. The elasticity curve is located below this tangent in the vicinity of a second displacement value corresponding to the end stop position of the exciter member.

10 Claims, 2 Drawing Sheets

ACTIVE HYDRAULIC ANTI-VIBRATION SUPPORT AND ACTIVE ANTIVIBRATION SYSTEM INCORPORATING SAID SUPPORT

FIELD OF THE INVENTION

The present invention relates to active hydraulic anti-vibration supports and to active anti-vibration systems incorporating such supports. Such supports are specifically intended for mounting engines on the bodies of motor vehicles and are designed to produce counter-vibrations to cancel out the effects of the vibrations generated by these engines.

BACKGROUND OF THE INVENTION

More specifically, the invention relates to an active hydraulic anti-vibration support designed to be inserted between two rigid elements and comprising:
- first and second rigid armatures intended to be fixed respectively to the two rigid elements to be connected,
- an elastomer body linking the two armatures to one another and partially bounding a working chamber filled with liquid,
- a flexible wall partially bounding a compensating chamber filled with liquid, which is connected to the working chamber by a throttled passage also filled with liquid,
- an exciter member having a first face communicating with the liquid contained in the working chamber and a second opposing face isolated from said working chamber, said exciter member being mounted so that it can move in a direction of displacement substantially perpendicular to the first and second faces of the exciter member, starting from a non-operating position,
- a control device designed to displace the exciter member at least in a first direction in said direction of displacement into an end stop position,
- an elastic return device permanently applying a force to the exciter member to return it to its non-operating position, in accordance with a certain elasticity curve which imparts said return force depending on the displacement undergone by this exciter member parallel with the direction of displacement, this curve having a tangent for a first displacement value (zero or not) corresponding to the non-operating position of the exciter member, and the return force having a certain threshold value for a second displacement value corresponding to the end stop position of the exciter member.

In known anti-vibration supports of this type, the elastic return device is substantially linear so that the elasticity curve essentially corresponds to said tangent.

These anti-vibration supports are satisfactory in terms of their function but nevertheless have the disadvantage of requiring a particularly powerful control device to immobilize the exciter member in its end stop position, especially if the vehicle engine is operating at a relatively high speed.

In effect, this being the case, the control device must apply to the exciter member a force which is significantly greater than said threshold value of the return force in order to guarantee that the exciter member will remain immobilized in spite of the dynamic stress applied to this member.

As a result, the control device must be over-rated if it is to be capable of immobilizing the exciter member, which makes this control device relatively heavy and expensive.

OBJECTS AND SUMMARY OF THE INVENTION

The objective of this invention is to overcome this disadvantage in particular.

To this end, an anti-vibration support as proposed by the invention is characterized in that the elasticity curve of the elastic return device is non linear and is located below said tangent, at least in the vicinity of the second displacement value.

As a result of these features, the force which the control device needs to exert in order to immobilize the exciter member in its locked position is less than the force that would be needed in the known anti-vibration supports, which means that it is no longer necessary to provide a higher capacity control device.

Preferred embodiments of the anti-vibration device proposed by the invention may incorporate one and/or the other of the following features:
- the elasticity curve of the return device has a maximum between the first and second displacement values;
- the elasticity curve of the return device has a minimum substantially on a level with the second displacement value;
- the elasticity curve of the return device has a linear initial part;
- the exciter member has an elastomer membrane which at least partially forms the return device, this membrane being of a substantially truncated cone shape in the non-operating position, converging towards the working chamber from an annular base joined to a rigid partition bounding said working chamber;
- the exciter member has a rigid central wall which is joined to the rigid partition by the elastomer membrane;
- the elastomer membrane has an annular zone of a reduced thickness in the vicinity of its annular base;
- the control device has a pneumatic chamber which is in contact with the second face of the exciter member and which is designed to be linked selectively either to a vacuum source or to the atmosphere.

Another objective of the invention is to provide an active anti-vibration system comprising:
- at least one active hydraulic anti-vibration support as defined above, in which the control device consists of a pneumatic chamber in contact with the second face of the exciter member,
- and an actuating device which is designed to be linked to at least one device serving as a sensor which receives information representative of the engine speed of the vehicle, this actuating device being designed to:
- cyclically link the pneumatic chamber with a vacuum source and to the atmosphere to cause the exciter member to vibrate so as to generate counter-vibrations in the working chamber if the information received by the device serving as a sensor indicates that the vehicle engine is operating at an idling speed;
- and link the pneumatic chamber permanently to the vacuum source if the information received by the device serving as a sensor indicates that the vehicle engine is operating at a speed higher than the idling speed so that the exciter member will then be retained in its end stop position.

Advantageously, the actuating device is designed so that the pneumatic chamber applies a mean force to the exciter member corresponding to a linear initial part of the elasticity curve of the return device if the engine is idling.

BRIEF DESCRIPTION OF THE DRAWINGS

Other features and advantages of the invention will become clear from the following description of one of its embodiments, given by way of example and not restrictive in any respect, and with reference to the appended drawings.

Of the drawings.

MORE DETAILED DESCRIPTION

The same reference numbers are used to denote the same or similar elements in the different drawings.

Throughout the description below, terms such as "top, bottom, lower, upper, horizontal, vertical" are used solely to make the description clear, referring to the position in which the device proposed by the invention is normally used, although these terms are not restrictive.

Figure 1:
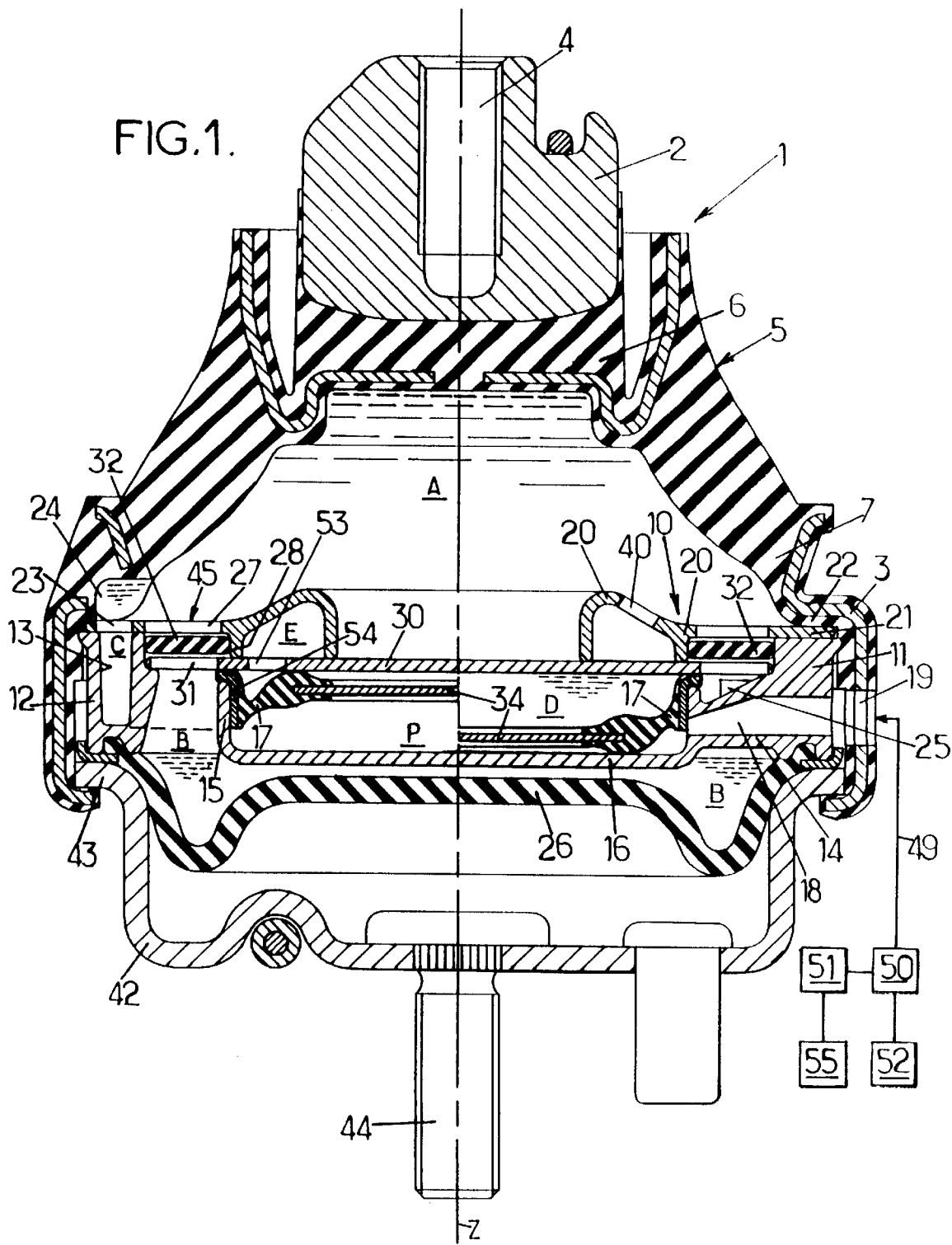
FIG. 1 is a view in vertical section of one embodiment of an anti-vibration support proposed by the invention, the piston which excites the anti-vibration support being shown in a non-operating position on the left-hand side of the drawing and in the end stop position on the right-hand side of the drawing.

As illustrated in FIG. 1, the hydraulic anti-vibration support 1 has first and second armatures 2, 3, which are designed to be fixed respectively to the engine block and the body of a motor vehicle.

In the example illustrated here, the first armature 2 is provided as a block centered on a vertical axis Z and which has a threaded hole 4 bored through it, enabling it to be secured to the engine block, whilst the second armature 3 is provided as a steel crown, also centered on the axis Z.

These two armatures 2, 3 are joined to one another by a relatively thick elastomer body 5, having a sufficient compression resistance to cope with the static force generated by the weight of the engine block. This elastomer body 5 has a bell-shaped side wall which extends between an apex 6 joined to the first armature 2 and an annular base 7 which is joined to the second armature 3.

Furthermore, the second armature 3 surrounds a rigid partition 10 which, together with the elastomer body 5, bounds a working chamber A filled with liquid.

In the example illustrated here, this partition 10 is a molded body 11 of light alloy, which in turn comprises:
- a crown 12 centered on the axis Z having a recessed groove 13 open at the top, which extends upwards at an angle across a part of the periphery of the crown 12,
- a tube 14 which extends radially from the crown 12 towards the interior,
- and an inner channel open at the top, comprising a lateral wall 15 joined to the inner end of the tube 14 and made integrally with a base 16, this lateral wall 15 optionally also being joined to the crown 12 by additional radial supports (not illustrated) distributed around the periphery of said ring.

In addition, a flexible elastomer membrane 17 is fixed by bonding onto the inner periphery of a ring 54 nested inside the lateral wall 15 in a force fit, so as to bound, in conjunction with the base 16, a sealed pneumatic chamber P which communicates only with an air duct 18 delimited on the interior by the tube 14 and opening to the exterior of the anti-vibration support through a bore 19 provided in the armature 3.

The flexible membrane 17 is of an annular truncated cone shape converging towards the top, i.e. towards the working chamber A, between an outer annular base 17$a$ joined to the ring 54 and a central part 17$c$ joined to a rigid plate 34 forming a piston, which constitutes an exciter member designed to generate counter-vibrations in the working chamber A.

The annular base 17$a$ and the central part 17$c$ of the membrane 17 are advantageously relatively thick and separated from one another by an annular part 17$b$ of a lesser thickness, which forms a hinge close to the membrane base 17$a$.

Figure 2:
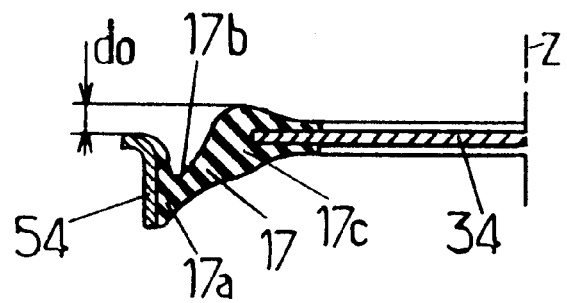
FIG. 2 is a half-view in section of the exciter piston and its elastic membrane, in the free state.

As illustrated in FIG. 2, in the free state, the central part 17$c$ of the membrane extends beyond the top edge of the ring 54 by a distance do so that the membrane 17 is slightly pre-stressed when mounted in the anti-vibration support 1 illustrated in FIG. 1, where the top edge of the central part 17$c$ of the membrane is located substantially on the same level as the top edge of the ring 54.

The membrane 17 described above has an elasticity curve F1($d$) imparting the elastic force F exerted by this membrane 17 on the rigid plate 34 to return it towards the working chamber depending on the downward displacement d of said exciter member from the free position illustrated in FIG. 2. This elasticity curve has a linear initial part 56 which extends as far as a maximum 57 (substantially corresponding to the horizontal alignment between the base 17$a$ and the central part 17$c$ of the membrane) and which is advantageously extended by a portion 58 descending to a minimum 59 beyond which the curve F1($d$) may optionally be extended still farther by a rising portion 60 corresponding to an elongation of the membrane 17.

Optionally, the elasticity curve of the membrane 17 may be of a different shape, provided this curve passes below the straight line F3($d$) extending the linear part 56 of the elasticity curve. i.e. below the tangent to the elasticity curve at point do on the abscissa (this tangent corresponds to the elasticity curve of an elastic membrane 17 having a purely radial form, for example, or another linear elastic return device such as a metal coil spring).

In all cases, however, the curve F1($d$) must assume positive values only, corresponding to a return of the rigid plate 34 to the non-operating position: in other words, the membrane 17 must not constitute a bistable spring.

Furthermore, the rigid partition 10 also has a cover 20, which, like the body 11, may be molded from a light alloy and which covers said body 11 in the direction of the working chamber A.

The cover 20 has a solid external annular part 21 which is applied in a tight contact fit against a downwardly directed shoulder 22, said shoulder being formed by the annular base 7 of the elastomer body and by the upper part of the second armature 3.

This external annular part 21 of the cover 20 closes off the upper part of the groove 13 provided in the body of the rigid partition, which, together with this groove, bounds a throttled passage C filled with liquid extending between:
- firstly, a first end which communicates with the working chamber A via a bore 23 provided in the external annular part 21 of the cover and via a recess 24 arranged in the inner part of the base 7 of the elastomer body,
- and secondly, a second end which opens radially towards the interior of the crown 12 via a recess 25 provided in this crown in order to communicate with a compensating chamber B filled with liquid, said compensating chamber being delimited between the rigid partition 10 and a flexible elastomer wall 26 in the form of a bellows, disposed underneath the partition 10.

Moreover the cover 20 may also optionally have, radially towards the interior of the annular part 21, an annular grate 27 formed by a series of holes distributed at an angle around the axis Z. On a level with the inner periphery of the grate 27, the cover has a crown 28 centered on the axis Z, which projects axially downwards, bearing on a rigid plate 30 extending in a plane perpendicular to said axis Z. At its outer periphery, this plate 30 has a series of axial holes distributed at an angle and forming a grate 31, disposed facing the above-mentioned grate 27 and forming in conjunction with it an annular nozzle 45, which is closed off by a valve 32, formed by an elastomer O-ring trapped with a very slight clearance between the grates 27 and 31.

A sheet metal casing 42 completes the anti-vibration support, covering the flexible wall 26 at the bottom, the periphery 43 of this casing being applied against the periphery of the flexible wall 26 which is in turn supported underneath the crown 12 of the body of the rigid partition 10, and the bottom edge of the second armature 3 being crimped underneath the outer periphery 43 of the casing to join the elastomer body assembly.

The base of the casing 42 has fixing means, comprising in particular a bolt 44 to fix said casing onto the body of the vehicle, thereby joining the second armature 3 to said body.

Finally, the air tube 14 is connected to an external pneumatic circuit 49, which is designed to communicate either with the air intake circuit 52 of the engine or with the atmosphere. The circuit 49 is placed in communication with the intake circuit 52 or with the atmosphere via a three-way solenoid 50 controlled by a control circuit 51 such as the on-board computer of the vehicle or any other.

The anti-vibration support described above operates as follows.

When the vehicle in which the anti-vibration support is mounted is not operating, this support remains in the non-operating position illustrated on the left-hand side of FIG. 1 and the central part 17c of the membrane 17 is in a stop position underneath the plate 30.

When the vehicle engine is started and is idling, thereby generating vibratory movements on a level with the first armature 2, which are generally at a frequency ranging between 20 and 80 Hz for example, the pneumatic chamber P is alternately placed under a pressure below atmospheric pressure and atmospheric pressure by means of the solenoid 50 controlled by the control circuit 51. This causes a vibratory motion of the flexible membrane 17 and the rigid plate 34, which oscillates between extreme positions corresponding to downward displacements between values d2 and d3 from the free position illustrated in FIG. 2.

Figure 3:
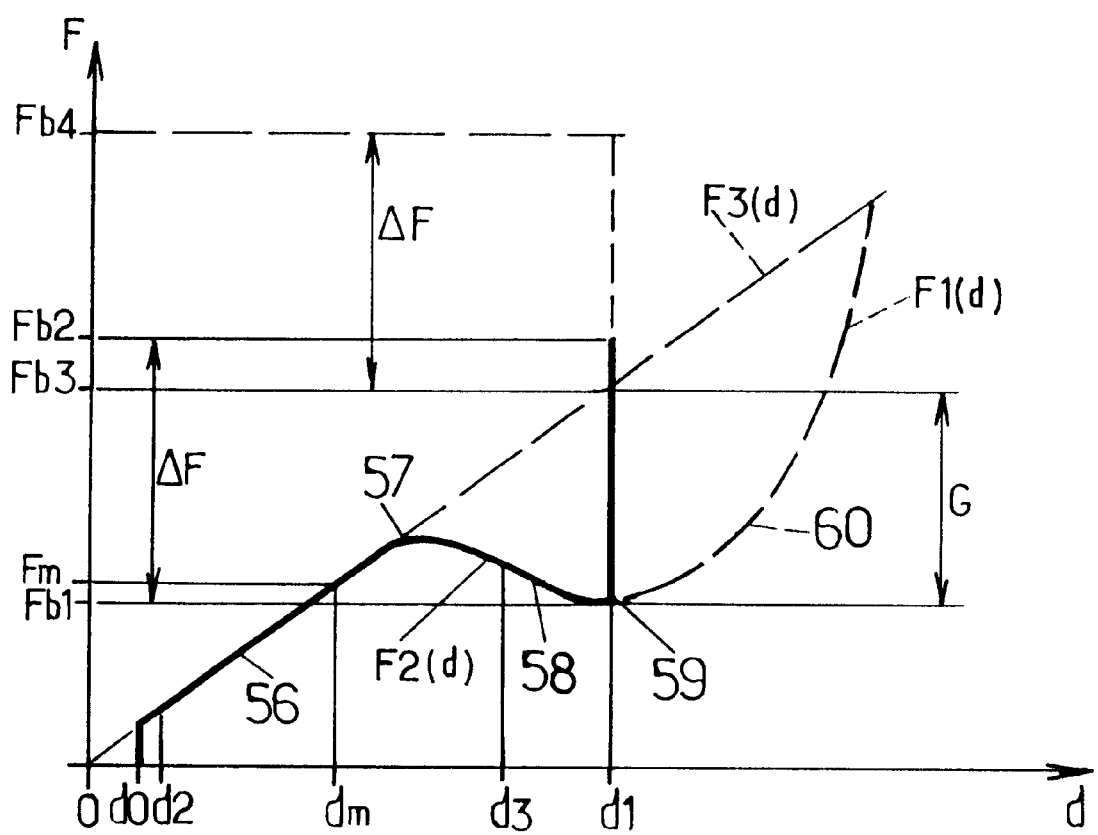
FIG. 3 is a graph showing the elasticity curve of the elastic membrane of the exciter piston belonging to the support illustrated in FIG. 1 (curve F1($d$)), the curve representing the force applied by the control device to this piston (curve F2($d$)) and the elasticity curve of a membrane with a linear elasticity (curve F3($d$)).

As illustrated in FIG. 3, in the example considered, these vibratory movements generally occur on the linear part 56 of the elasticity curve $F1(d)$ and on a part of its descending portion 58.

In all cases, it is desirable for the mean displacement dm to which the rigid plate 34 is subjected during these oscillations due to the mean force Fm exerted on the rigid plate 34 to be located on the linear part 56 of the curve $F1(d)$.

These vibratory movements generate counter-vibrations in the intermediate chamber D between the membrane 17 and the plate 30, intended to neutralize the effects of the engine's vibrations. These counter-vibrations are optimized by the control circuit 51 in accordance with a pre-set program depending on the engine speed and various parameters which may influence the idling vibrations (operation of the air-conditioning system, electricity consumption, engine temperature, etc.) by acting on the following parameters, for example:

the amplitude of the vibrations of the rigid plate 34, which is controlled by acting on the cyclical ratio of the signal sent to the solenoid 50 (ratio between the time during which the solenoid 50 places the pneumatic chamber P under vacuum and the total duration of a period of vibrations), the phase of the vibrations of the rigid plate 34, controlled by acting on the initial instant of each actuation cycle of the solenoid 50 relative to the engine speed, which speed is detected by a sensor 55, for example, on the basis of a given cylinder passing through its top dead center.

The counter-vibrations thus generated by the rigid plate 34 in the intermediate chamber D are transmitted to the working chamber A via the throttled passage E between the cover 20 and the plate 30, this passage E communicating with the working chamber A via an orifice 40 provided in the cover 20 and with the intermediate chamber D via an orifice 53 provided in the plate 30. The throttled passage E is dimensioned so as to have a resonance frequency within the range between 10 and 90 Hz, for example, and corresponding substantially to the idling frequency. Given its very small clearance, the uncoupling valve 32 does not significantly disrupt the effect of the counter-vibrations.

It should be pointed out that the pneumatic control of the rigid plate 34 or any other exciter member could be replaced by an electro-mechanical and/or electromagnetic control without departing from the scope of the invention, this control preferably acting only in the direction of displacement of the rigid plate 34 opposing the working chamber A whilst the membrane 17 or any other elastic means acts in the opposite direction.

When the vehicle is travelling and its engine is operating at a high enough speed, corresponding to frequency vibrations in excess of 90 Hz, for example, the solenoid 50 is actuated in order to place the pneumatic chamber P permanently under vacuum, as illustrated in the right-hand part of FIG. 1. As a result, the flexible membrane 17 is applied substantially against the base 16 in an end stop position. Accordingly, whilst the vehicle is travelling, the valve 32 ensures that the armatures 2 and 3 are axially uncoupled from vibrations of a high-frequency and low amplitude (for example, a frequency above 20 Hz and amplitude of less than 1 mm) whereas the throttled passage C is dimensioned to represent a resonance frequency generally lower than 20 Hz so as to dampen the chopping motion, of a relatively low frequency (for example less than 20 Hz) and relatively high amplitude (for example greater than 1 mm) generated by the rolling motion of the vehicle.

As illustrated in FIG. 3, the end stop position of the rigid plate 34 preferably corresponds to a displacement d1 of said piston (relative to the free state illustrated in FIG. 2) substantially corresponding to the minimum 59 of the curve $F1$ $(d)$. In this position, a force $F2$ $(d)$ is exerted on the rigid plate 34 having a value $Fb2-Fb1+\Delta F$, where $Fb1$ is the value $F1$ (d1) given by the elasticity curve of the membrane 17 and $\Delta F$ is a safety mark guaranteeing that the rigid plate 34 will remain immobilized.

By comparison, if an elastic membrane with a linear behavior across any range of use were to be used, i.e. a membrane conforming to the curve $F3$ $(d)$, as is the case with the known systems, it would be necessary to apply a force $Fb4-Fb3+\Delta F$ to the rigid plate 34, where $Fb3-F3$ (d1). Since $Fb3$ is higher than $Fb1$, it would therefore be necessary to apply a force considerably higher than that required by this invention. The invention therefore enables the rating of the pneumatic system actuating the piston 34 to be reduced since the maximum force produced by this system may be less than the maximum force produced in the known anti-vibration supports by G=Fb3−Fb1.

I claim:

1. Active hydraulic anti-vibration support designed to be interposed between two rigid elements and comprising:

first and second rigid armatures intended to be fixed respectively to the two rigid elements to be connected, an elastomer body linking the two armatures to one another and partially bounding a working chamber filled with liquid, a flexible wall partially bounding a compensating chamber filled with liquid, which is connected to the working chamber by a throttled passage also filled with liquid, an exciter member having a first face communicating with the liquid contained in the working chamber and a second opposing face isolated from said working chamber, said exciter member being movably mounted in a direction of displacement substantially perpendicular to the first and second faces of the exciter member, starting from a non-operating position, a control device designed to displace the exciter member at least in a first direction in said direction of displacement into an end stop position, an elastic return device permanently applying a force to the exciter member to return it to its non-operating position, in accordance with a certain elasticity curve which imparts said return force depending on the displacement undergone by this exciter member parallel with the direction of displacement, this curve having a tangent for a first displacement value corresponding to the non-operating position of the exciter member, and the return force having a certain threshold value for a second displacement value corresponding to the end stop position of the exciter member, wherein the elasticity curve of the return device is non linear and is located below said tangent at least in the vicinity of the second displacement value.

2. Anti-vibration support as claimed in claim 1, in which the elasticity curve of the return device has a maximum between the first and second displacement values.

3. Anti-vibration support as claimed in claim 1 or claim 2, in which the elasticity curve of the return device has a minimum substantially on a level with the second displacement value.

4. Anti-vibration support as claimed in claim 1, in which the elasticity curve of the return device has a linear initial part.

5. Anti-vibration support as claimed in claim 1, in which, in the non-operating position, the return device is an elastomer membrane which is of a substantially truncated cone shape converging towards the working chamber from an annular base joined to a rigid partition bounding said working chamber.

6. Anti-vibration support as claimed in claim 5, in which the exciter member has a rigid central wall which is joined to the rigid partition by the elastomer membrane.

7. Anti-vibration support as claimed in claim 5, in which the elastomer membrane has an annular zone of a reduced thickness in the vicinity of its annular base.

8. Anti-vibration support as claimed in claim 1, in which the control device is a pneumatic chamber which is in contact with the second face of the exciter member and which is designed to be linked selectively either to a vacuum source or to the atmosphere.

9. Active anti-vibration system comprising:

at least one active hydraulic anti-vibration support as claimed in claim 8, and an actuating device which is designed to be linked to at least one device serving as a sensor to receive information representative of the engine speed of the vehicle, this actuating device being designed to:

cyclically link the pneumatic chamber alternately with a vacuum source and with the atmosphere in order to cause the exciter member to vibrate so as to generate counter-vibrations in the working chamber if the information received by the device serving as the sensor indicates that the vehicle engine is operating at an idling speed;

and link the pneumatic chamber permanently to the vacuum source if the information received by the device serving as the sensor indicates that the vehicle engine is operating at a speed higher than the idling speed so that the exciter member is then retained in its end stop position.

10. Anti-vibration system as claimed in claim 9, in which the actuating device is designed so that the pneumatic chamber applies to the exciter member a mean force corresponding to a linear initial part of the elasticity curve of the return device when the engine is idling.

* * * * *